United States Patent Office 3,358,423
Patented Dec. 19, 1967

3,358,423
SUBSTRATES FOR GAS CHROMATOGRAPHY
Emanuel M. Amir, Baytown, Tex., assignor to Esso Research and Engineering Company
Filed Sept. 29, 1965, Ser. No. 488,635
5 Claims. (Cl. 55—67)

ABSTRACT OF THE DISCLOSURE

Oleic acid esters of polyhydric alcohols having no hydrogen attached to the β carbon of the alcohol component are liquid solvents in gas chromatography. Specifically, pentaerythritol tetraoleate and tripentaerythritoloctaoleate are used to separate mixtures of paraffins and olefins.

---

The present invention is directed to the separation of hydrocarbon mixtures by gas chromatography. More particularly, the invention is directed to unique liquid solvents for use in gas chromatography. In its more specific aspects, the invention is directed to oleic acid esters in which the alcohol component of the ester has no β hydrogen atoms, the esters being unique as solvents in separating hydrocarbon mixtures by gas chromatography.

The invention may be briefly described as unique liquid solvents for use in gas chromatography which comprises the oleic acid esters of polyhydric alcohols having no hydrogen attached to the β carbon of the alcohol component. The oleic acid esters of the present invention are those formed by the reaction of oleic acid with an alcohol selected from the group having the following formulae:

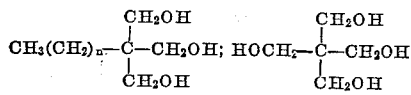

and

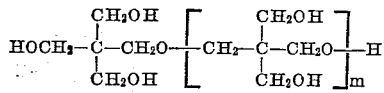

where:

$n$ is 0 to 6, preferably 0; and
$m$ is 1 or 2

Heretofore, many compounds or classes of compounds have been tried to separate hydrocarbons on the basis of boiling point. Most hydrocarbons, however, exist as a multicomponent mixture having hydrocarbons of different types, e.g. olefins, paraffins and aromatics or a range of carbon numbers or hydrocarbon isomers, which have similar boiling points. The technique of gas chromatographic analysis is most useful in determining multicomponent mixtures of hydrocarbons of different types. However, in the analysis of such a multicomponent mixture, when a strictly boiling point separation is relied upon, the analysis is often erroneous, since there is an inversion on the basis of boiling point resulting from the different type of hydrocarbon components in the mixture by a higher boiling material being indicated as the lower boiling component on a chromatogram. This inversion of boiling point on the chromatogram is called a boiling point overlap. To overcome this problem of boiling point overlap, it is customary to use a weakly polar stationary liquid in a gas chromatographic separation. The weakly polar liquids which have been found suitable allow the separation of hydrocarbons boiling only at the lower temperature ranges since these polar liquids themselves have boiling points too low to analyze materials which boil at temperatures of 200° C. or higher. Thus, there has been a serious limitation on the use of gas chromatographic analysis since the boiling points of the known polar solvents are so low that they themselves vaporize into the hydrocarbon mixture and cause interference with the analysis. It is obvious that if the polar solvent vaporizes within the analyzing column and passes overhead with the samples, the solvent will interfere with the analysis of the chromatographically separated components of the hydrocarbon mixture. The problem of selecting polar stationary liquids for gas chromatographic separation on the basis of chemical structure, internal forces and solution interaction is well described in Gas Chromatography, by A. I. M. Keulemans, Reinhold Publishing Corporation, 1st edition, 1957, which is incorporated herein by reference.

The characteristics required of a stationary liquid solvent for gas chromatographic separation are many, and heretofore it has been a matter of compromising these characteristics to choose certain compounds or class of compounds for a particular separation of hydrocarbons. One of the characteristics required of the stationary liquid solvent is that the solvent exhibit sufficient solubility for the components of the hydrocarbon mixture to provide a residence time within the columns sufficient to allow a separation of the various components of the hydrocarbon mixture into discrete phases. Another characteristic is that the solvent must have a selectivity with respect to the various types of hydrocarbons in the hydrocarbon mixture so that the discrete phases of each of the components will be formed during the residence time. Further, the stationary liquid solvent must have a low viscosity which aids in the efficiency of the column and is related to the number of theoretical plates which may be obtained. As discussed above so as to overcome the problem of boiling point overlap, the stationary solvent must have a degree of polarity so as to separate the types of hydrocarbons even though the types of hydrocarbons may have the same or substantially the same boiling point within the hydrocarbon mixture. Still further, the stationary liquid solvent must exhibit properties of stability. The properties of stability are that the solvent has a very low vapor pressure so that the solvent will remain in the column even when heated to high temperatures. Further, the solvent must be stable thermally so that it does not undergo any degradation reactions upon heating. Still further, the solvent must be stable in a sense that it is not reactive with the hydrocarbon mixture. Thus, it must not enter an irreversible reaction with itself or with the components of the hydrocarbon mixture.

It is an object of the present invention to form oleic acid esters which have unique properties in gas chromatographic separations.

Another object is to use the oleic acid esters of the present invention as solvents in gas chromatographic separations.

Other objects and advantages of the present invention will be described in the following description.

The oleic acid esters of the present invention are unique liquid solvents in the vapor-liquid partition chromatographic separation in that they have relatively high molecular weights and, accordingly, low vapor pressures. It was surprising to find that the high molecular weight oleic acid esters of the present invention are liquids and have a relatively low viscosity. Thus, the oleic acid esters are capable of withstanding higher temperatures and also numerous separations which have heretofore been impossible. The oleic acid esters of the present invention have no β hydrogen atoms in the alcohol component of the ester and have been found to be thermally stable under conditions of gas chromatography. Further, the esters are nonreactive with hydrocarbons and, thus, meet all of the stability requirements necessary of a suitable solvent for partition chromatography. The polarity of the oleic acid esters of the present invention appears to be of specific uniqueness since separations of different types of hydrocarbons which are present in multicomponent hydrocarbon mixtures are obtained almost exclusively on the basis of the boiling point. Thus, the oleic acid esters of the present invention provide a liquid solvent for the chromatographic separation of hydrocarbon mixtures based on the boiling point of the components which may be used to analyze unknown mixtures of hydrocarbons or to control a particular component of a hydrocarbon mixture.

The oleic acid esters of the present invention are those formed in the esterification of oleic acid and an alcohol selected from pentaerythritol, polypentaerythritol and alcohols having the following formula:

$$CH_3(CH_2)_n-\underset{\underset{CH_2OH}{|}}{\overset{\overset{CH_2OH}{|}}{C}}-CH_2OH$$

where $n$ is 0 to 6, preferably 0.

The oleic acid esters of the present invention may be formed by mixing or dissolving the oleic acid and the polyhydric alcohol in a suitable solvent with a catalytic amount of strong acid. The water formed in the reaction is removed by suitable means. Preferred solvents for the esterification are aromatic compounds, such as benzene, toluene or xylene. The strong acids commonly used are hydrochloric, sulfuric and toluene sulfonic acids. The mixture of the acid and alcohol is heated to reflux temperatures until the equivalent amount of water to form the ester is removed. The preferred oleic acid ester of the present invention is pentaerythritol tetraoleate, which may be made by the direct esterification of pentaerythritol with oleic acid or by an ester interchange method or in some other suitable manner.

The present invention will be further illustrated by reference to the drawing in which there is illustrated representative chromatographs obtained by practicing the present invention.

Figure 1:
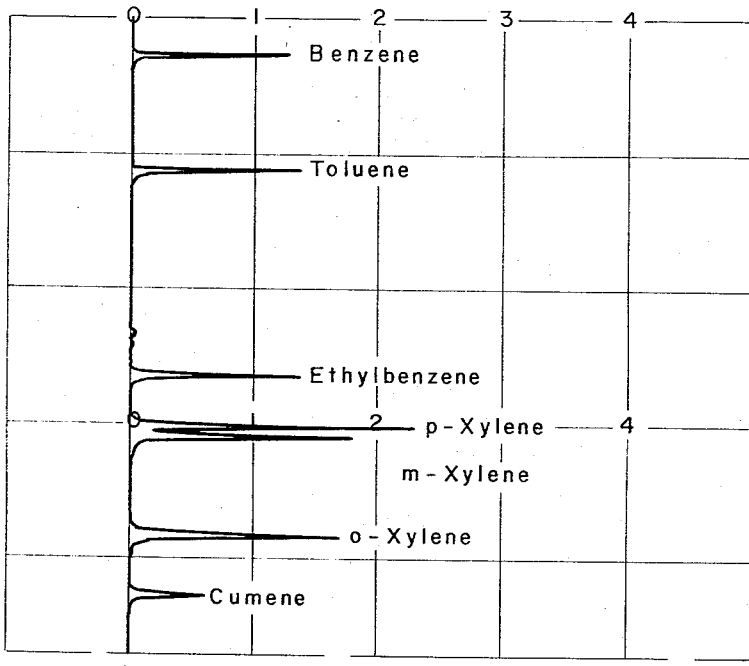
FIG. 1 is a chromatogram illustrating the separation of an aromatic mixture.

Referring now in particular to FIG. 1, an aromatic mixture containing seven components as illustrated were completely resolved in a 300-foot open bore, high resolution column. The column had an inside diameter of 0.01 inch. The column was coated with pentaerythritol tetraoleate. The temperature was maintained at 100° C. under a helium pressure of 20 p.s.i.g. The column was equipped with a hydrogen flame detector. The chromatograph obtained is illustrated in FIG. 1. As can be seen by the chromatograph, each component of the mixture was individually resolved and each was resolved according to the boiling point of the components.

Figure 2:
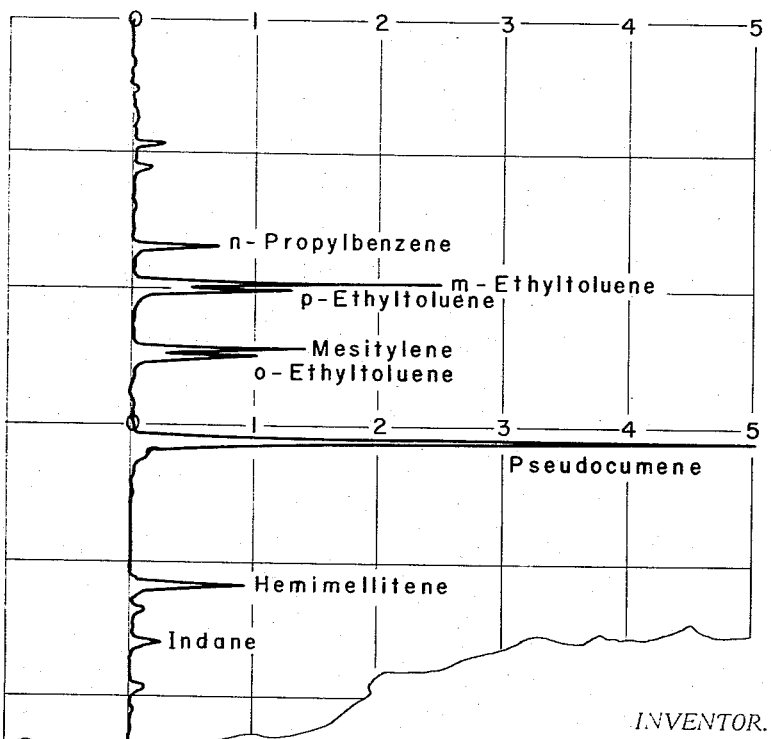
FIG. 2 is a chromatogram illustrating the separation of a $C_9$ aromatic mixture into its respective components.

A $C_9$ mixture was also completely resolved by using pentaterythritol tetraoleate as the solvent in a column similar to that used above. The temperature was maintained at about 120° C. at a helium pressure of 25 p.s.i.g. The chromatogram obtained is that illustrated in FIG. 2 which again shows each component completely resolved.

Besides the above mixtures, the following mixtures were completely resolved with pentaerythritol tetraoleate.

*Paraffins.*—A 23-component mixture of isomeric heptanes and octanes. The chromatograph obtained resolved the 23 components.

*Olefins.*—A 13-component mixture of isomeric hexenes.

From the foregoing it can be seen that pentaerythritol tetraoleate is unique as a solvent for use in gas chromatography. Its uniqueness lies primarily in the fact that it is able to resolve aromatics, paraffins and olefins. No other solvent used in gas chromatography is known which will resolve all types of hydrocarbons.

As set forth above, the method for preparing pentaerythritol tetraoleate may be by conventional methods. A specific and preferred method is as follows:

A mixture containing pentaerythritol, 34 g. (0.25 mol); oleic acid, 288 g. (1.05 mol); toluene sulfonic acid monohydrate, 1.9 g. (0.01 mol); and 150 ml. toluene is heated with stirring under reflux. The water of reaction is removed with the refluxing toluene in a water leg until no more water collects, about 0.95 mol of water is collected. The reaction mixture is then cooled, the toluene evaporated under reduced pressure, and the crude ester distilled in a molecular still.

Pentaerythritol tetraoleate is collected at 150° to 175° C. at about 6 micron pressure.

While the preferred substrate of the present invention is pentaerythritol tetraoleate, the mixtures illustrated above were also resolved with tripentaerythritol octaoleate. However, because of the higher viscosity of tripentaerythritol octaoleate, there was not the same high resolution as was obtained with pentaerythritol tetraoleate. Other substrates which may be used according to the present invention are the oleate esters of trimethylol hexane, trimethylol propane and trimethylol ethane.

The nature and object of the present invention having been completely described and illustrated and the best mode thereof contemplated set forth, what I wish to claim as new and useful and secure by Letters Patent is:

1. An improved method for separating hydrocarbon mixtures by gas chromatography which comprises utilizing as the solvent an oleic acid ester of an alcohol selected from the group consisting of the following formulae:

$$CH_3(CH_2)_n-\underset{\underset{CH_2OH}{|}}{\overset{\overset{CH_2OH}{|}}{C}}-CH_2OH; \quad HOCH_2-\underset{\underset{CH_2OH}{|}}{\overset{\overset{CH_2OH}{|}}{C}}-CH_2OH$$

and $$HOCH_2-\underset{\underset{CH_2OH}{|}}{\overset{\overset{CH_2OH}{|}}{C}}-CH_2O\left[-CH_2-\underset{\underset{CH_2OH}{|}}{\overset{\overset{CH_2OH}{|}}{C}}-CH_2O-\right]_m H$$

where:
$n$ is 0 to 6, and
$m$ is 1 or 2.

2. A method according to claim 1 wherein said hydrocarbon mixture is an aromatic mixture.

3. A method according to claim 1 wherein said hydrocarbon mixture is a paraffinic mixture.

4. A method according to claim 1 wherein said hydrocarbon mixture is an olefinic mixture.

5. An improved method for separating hydrocarbon mixtures by gas chromatography which comprises utilizing as the solvent pentaerythritol tetraoleate.

No references cited.

REUBEN FRIEDMAN, *Primary Examiner.*

J. L. DE CESARE, *Assistant Examiner.*